Figures 1, 2:
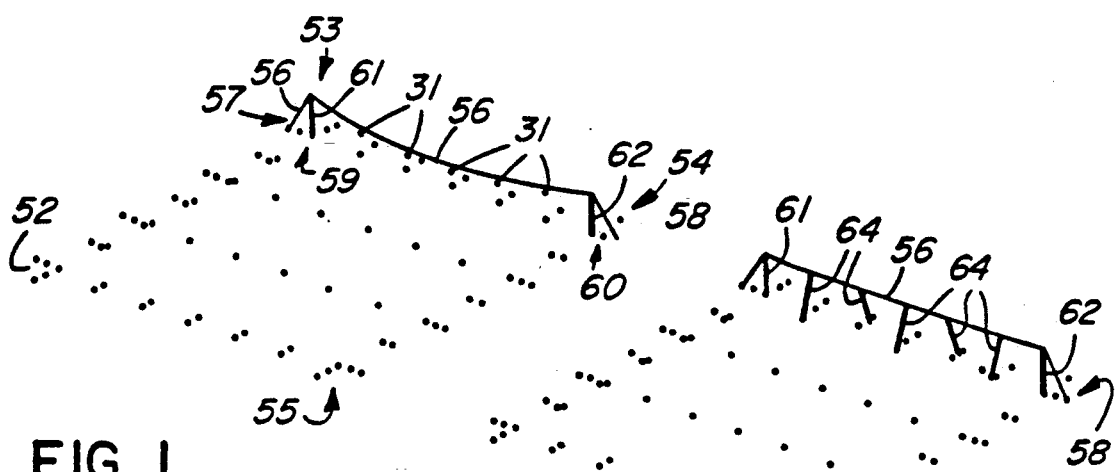
Figures 3, 4:
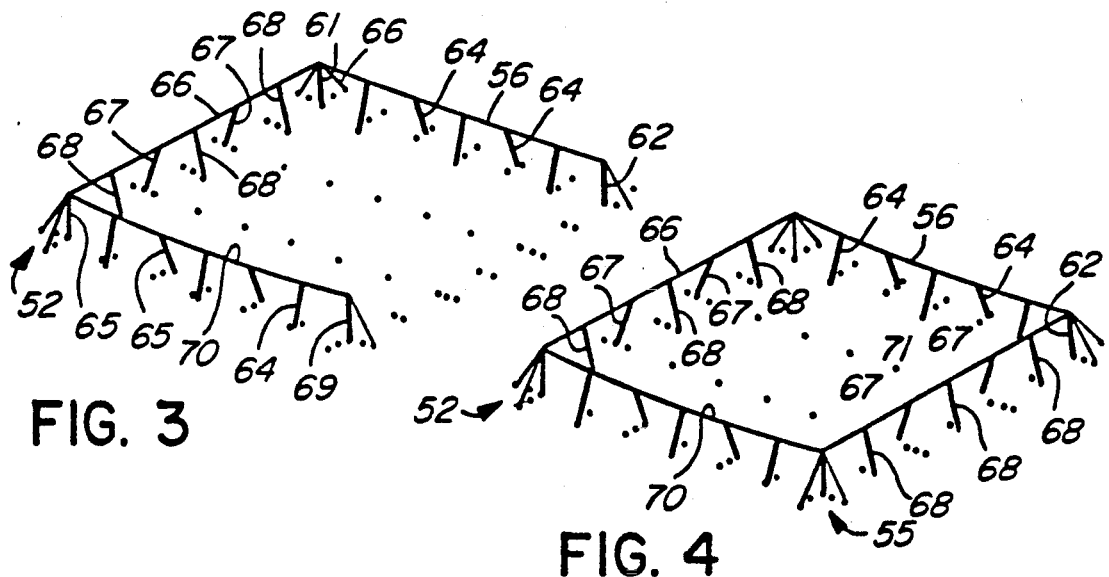

United States Patent [19]

Huffman

[11] Patent Number: 5,311,699
[45] Date of Patent: May 17, 1994

[54] SHADE HOUSE

[76] Inventor: David Huffman, P.O. Box 70, R.R. #3, Vanessa, Ontario, N0E 1V0, Canada

[21] Appl. No.: 921,581

[22] Filed: Jul. 30, 1992

[30] Foreign Application Priority Data

Jul. 30, 1991 [CA] Canada .................................. 2048157

[51] Int. Cl.⁵ ............................................. A01G 13/00
[52] U.S. Cl. .......................................... 47/26; 52/63; 52/83
[58] Field of Search ............ 47/26, 31, 17 A, 17 FM; 52/83, 63, 157, 165

[56] References Cited

U.S. PATENT DOCUMENTS

| 3,140,563 | 7/1964 | Allen | 47/20 |
| 3,318,560 | 5/1967 | Garrette | 52/157 |
| 4,068,404 | 1/1978 | Sheldon | 47/26 |

FOREIGN PATENT DOCUMENTS

| 325338 | 10/1975 | Austria . | |
| 1003641 | 1/1977 | Canada . | |
| 199592 | 10/1986 | European Pat. Off. . | |
| 3130909 | 2/1983 | Fed. Rep. of Germany . | |
| 3504133 | 8/1986 | Fed. Rep. of Germany | 52/83 |
| 2646196 | 10/1990 | France . | |
| 8901473 | 1/1991 | Netherlands | 47/17 FM |
| WO84/04774 | 12/1984 | PCT Int'l Appl. . | |
| WO86/01849 | 3/1986 | PCT Int'l Appl. . | |
| 250708 | 10/1973 | Switzerland . | |
| 224808 | 11/1984 | Switzerland . | |
| 1187723 | 4/1970 | United Kingdom . | |

Primary Examiner—Henry E. Raduazo
Attorney, Agent, or Firm—Stevens, Davis, Miller & Mosher

[57] ABSTRACT

The structure of a shade house is disclosed which is comprised of a plurality of upright posts with cables tensioned therebetween to provide a support for a shade producing fabric to be placed over a designated area. The structure is easy to assemble and includes improved structural elements such as the combination of a post with a separate top which supports the roof cable, and a separate earth anchor threadably driven into the ground. The roof is comprised of a number of supporting cables preferably forming a rectangular grid, and by a system of parallel holding cables which extend over the top surface of the roof fabric with the latter is installed. The fabric is installed by way of a plurality of strips which can be wound up and stored in the wound up position during winter months or the like.

10 Claims, 11 Drawing Sheets

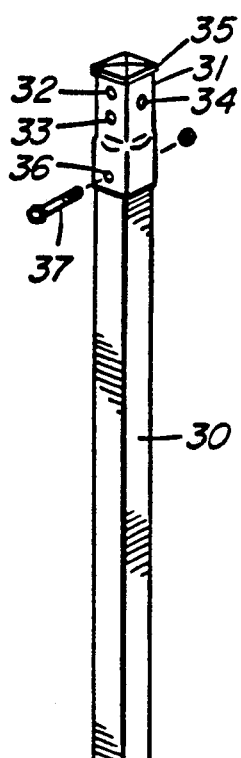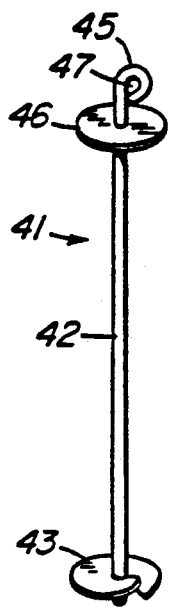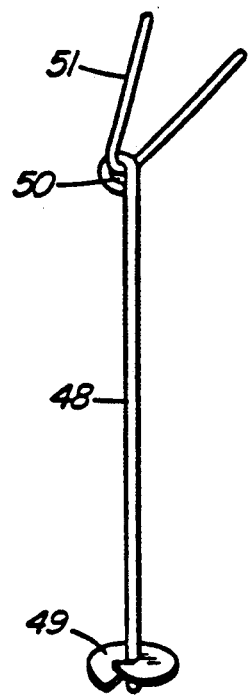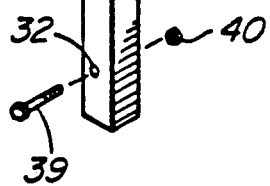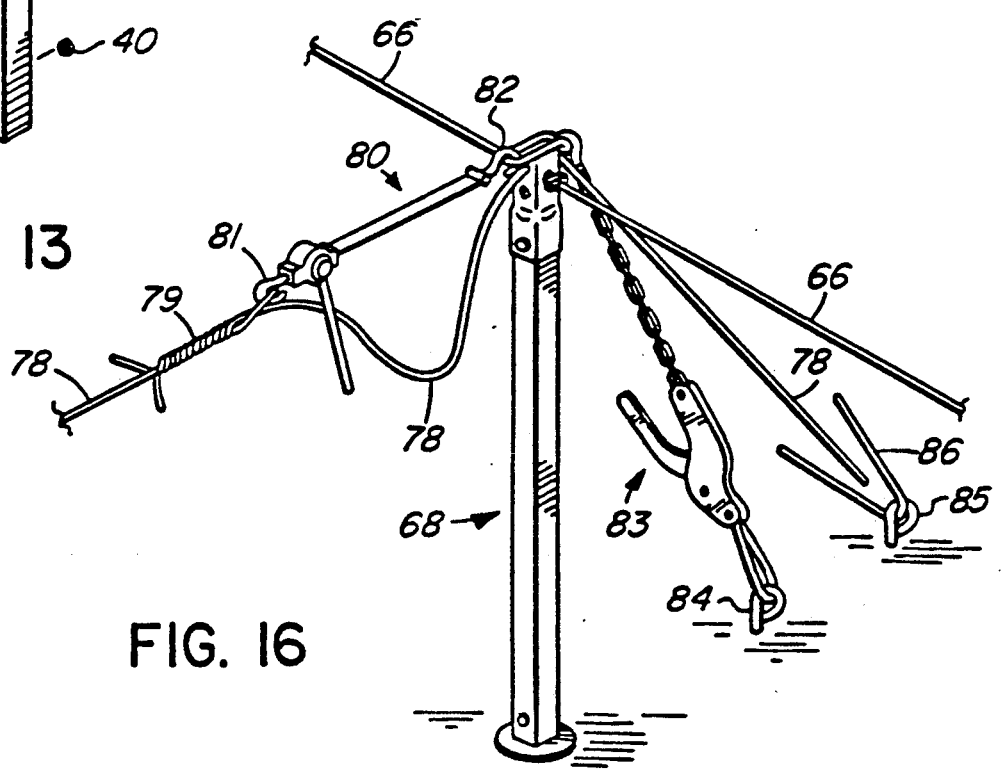
FIG. 14
FIG. 15
FIG. 13
FIG. 16

SHADE HOUSE

The present invention relates to a shade house intended for use in horticultural applications, both inside or out of greenhouses. The known shade houses of this type typically include a shade fabric supporting structure and the fabric itself. A typical embodiment of shade house of this type is shown in Canadian Patent 1,003,641 issued Jan. 18, 1977 (Grossman et al). The disadvantage of this known structure is in its relatively low rigidity which makes the application of the shade house difficult in an open space as opposed the application inside the green houses. Another typical known arrangement is represented by U.S. Pat. No. 4,068,404, issued Jan. 17, 1978 to R. T. Sheldon. While the structure has an improved rigidity, the improvement is offset by the disadvantage of relatively high cost and cumbersome way of erecting the structure, due primarily to the provision whereby the periphery of a fabric supporting structure includes solid beams extending between adjacent peripheral posts. The shade producing fabric is fixed to the beams and covered with an optional board which is nailed through the fabric edge to the respective beam below. This arrangement is difficult to disassemble, in case of emergency, such as approaching heavy storm or the like. Thus, the advantage of an improved rigidity is offset by the disadvantage of relatively high cost and virtually non-existent portability of the knocked-down structure. Both types of shade houses mentioned above require relatively high skills to be erected.

It is an object of the present invention to simplify the structure of the shade house so as to facilitate its erection, while providing a rigid structure which is capable of being built in an open area exposed to elements such as wind, rain etc.

In general terms, the present invention provides a shade house including a plurality of cable supporting poles anchored to the ground to provide an above-the-ground support structure for a flat roof formed by a shading flexible sheet material to hold the flexible sheet material at a predetermined spacing above the ground, said assembly comprising, in combination: a plurality of corner poles, each anchored to the ground; a plurality of peripheral poles disposed at a generally equidistant spacing between each pair of adjacent corner poles; anchor cable means disposed exteriorly of the shade house, and secured each to the respective corner pole or peripheral pole and anchored to the ground, to hold said corner and peripheral poles in a generally upright position and to maintain cable means extending between the poles in a tensioned state; peripheral cable means tensionally extending between top portions of adjacent corner poles and through top portions of peripheral poles disposed between said adjacent corner poles such that the peripheral cable means generally corresponds to the periphery of the shade house; a plurality of inside poles spaced from each other to define a pattern of cable support points disposed within the plan of the shade house; a plurality of inside roof supporting cables extending between respective pairs of opposed peripheral poles and supported by a respective plurality of said inside poles; a shading flexible sheet material forming said flat roof of said shade house, supported by said inside roof supporting cables and having peripheral edge portions secured to said peripheral cable means; a plurality of holding cable means parallel with and generally equidistantly spaced from each other and disposed parallel with and closely vertically spaced above at least some of the inside roof supporting cables, with said shading flexible sheet material means disposed therebetween.

Figure 17:
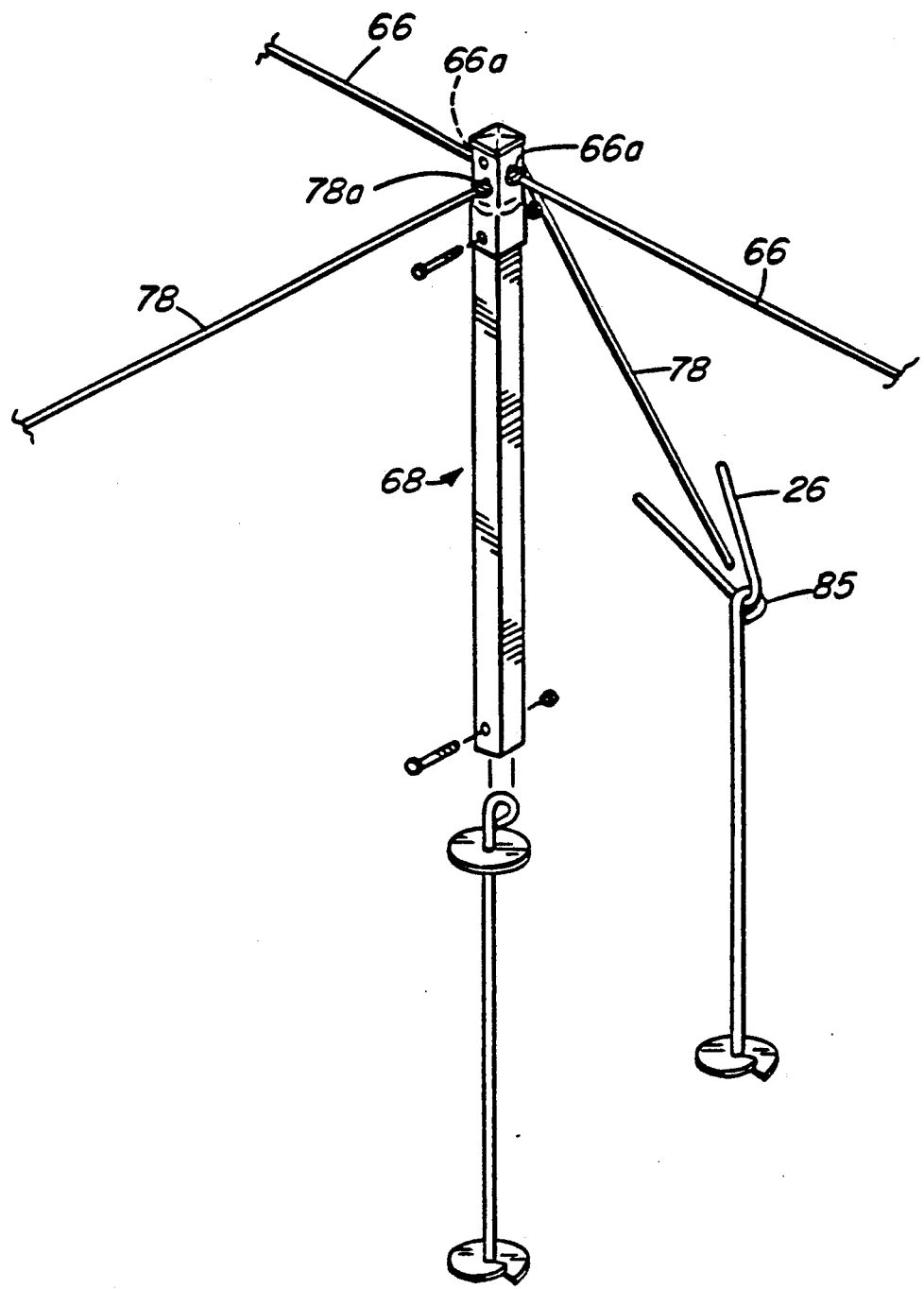
Figure 18:
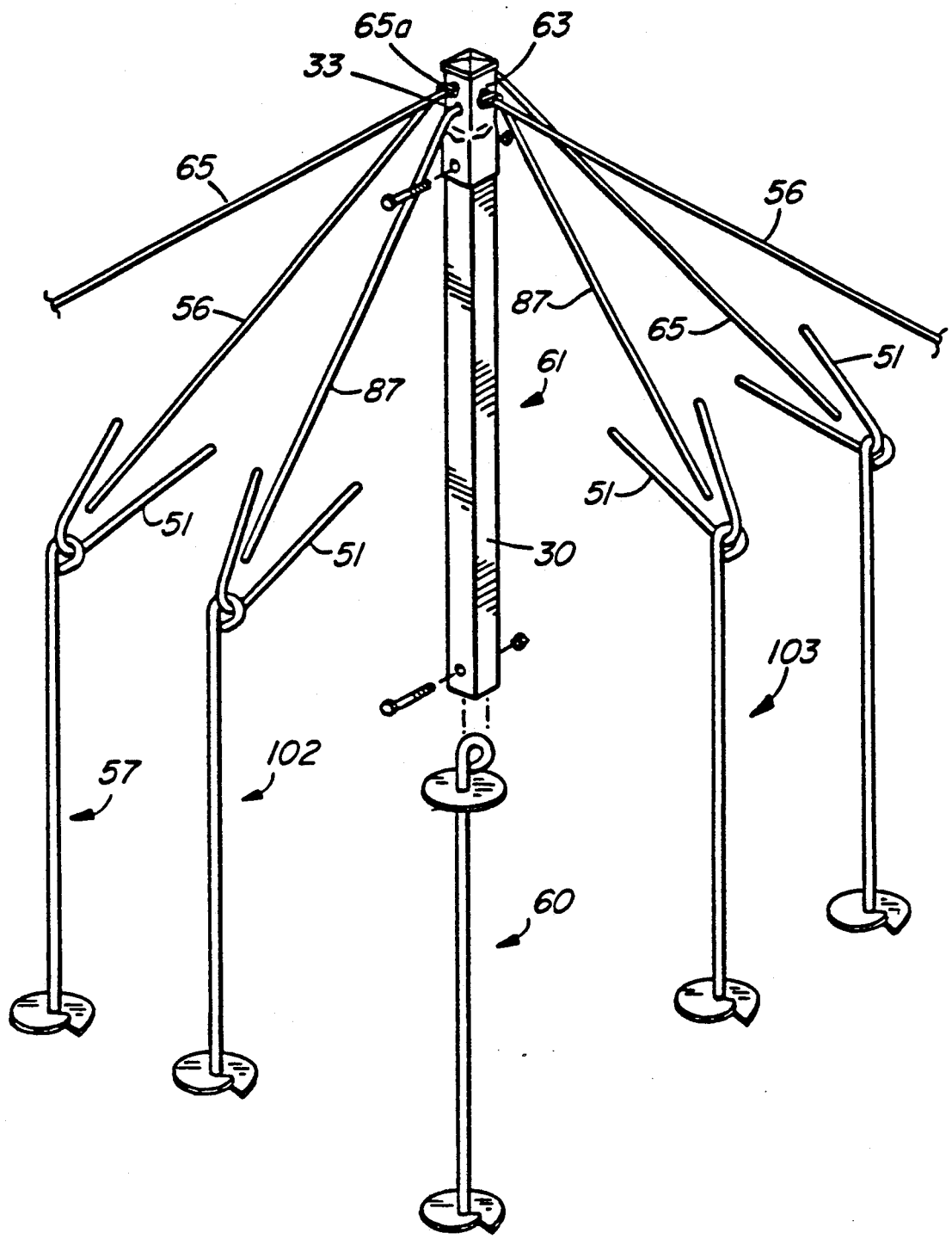
Figure 19:
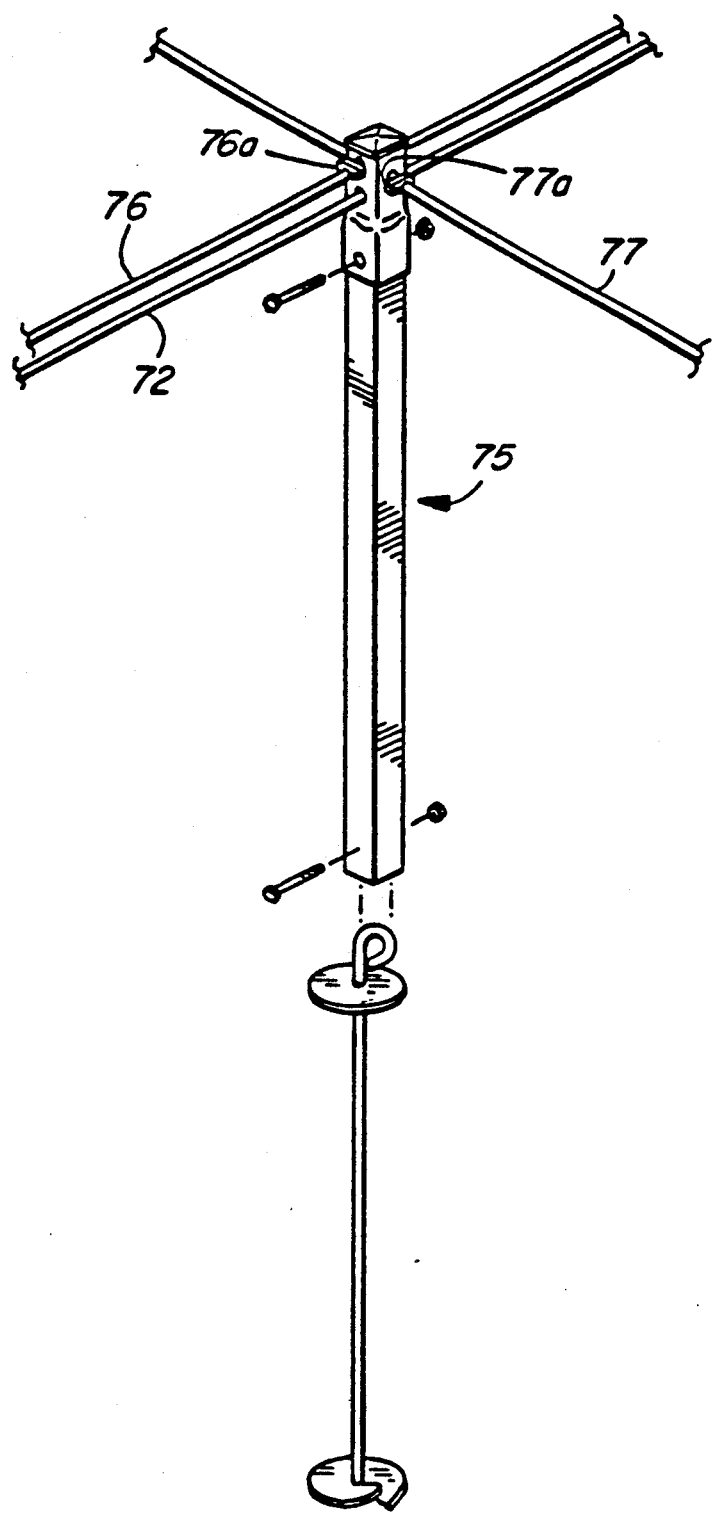

The invention will be described in greater detail by way of a preferred embodiment, with reference to the accompanying simplified, diagrammatic drawings, which show:

FIGS. 1-12 diagrammatic representations of the steps in constructing an exemplary embodiment of the shade house according to the present invention;

FIG. 13 a perspective view showing a preferred embodiment of a pole structure, explanatory of the terminology used in the disclosure;

FIG. 14 a perspective view of an anchor for use with the pole of FIG. 13;

FIG. 15 a perspective view of a cable anchor;

FIG. 16 installation of a cable on a pole;

FIG. 17 an exploded view indicating the installation of a dummy pole;

FIG. 18 an exploded view indicating the installation of a corner pole;

FIG. 19 an exploded view indicating the installation of an inside pole

Figure 20:
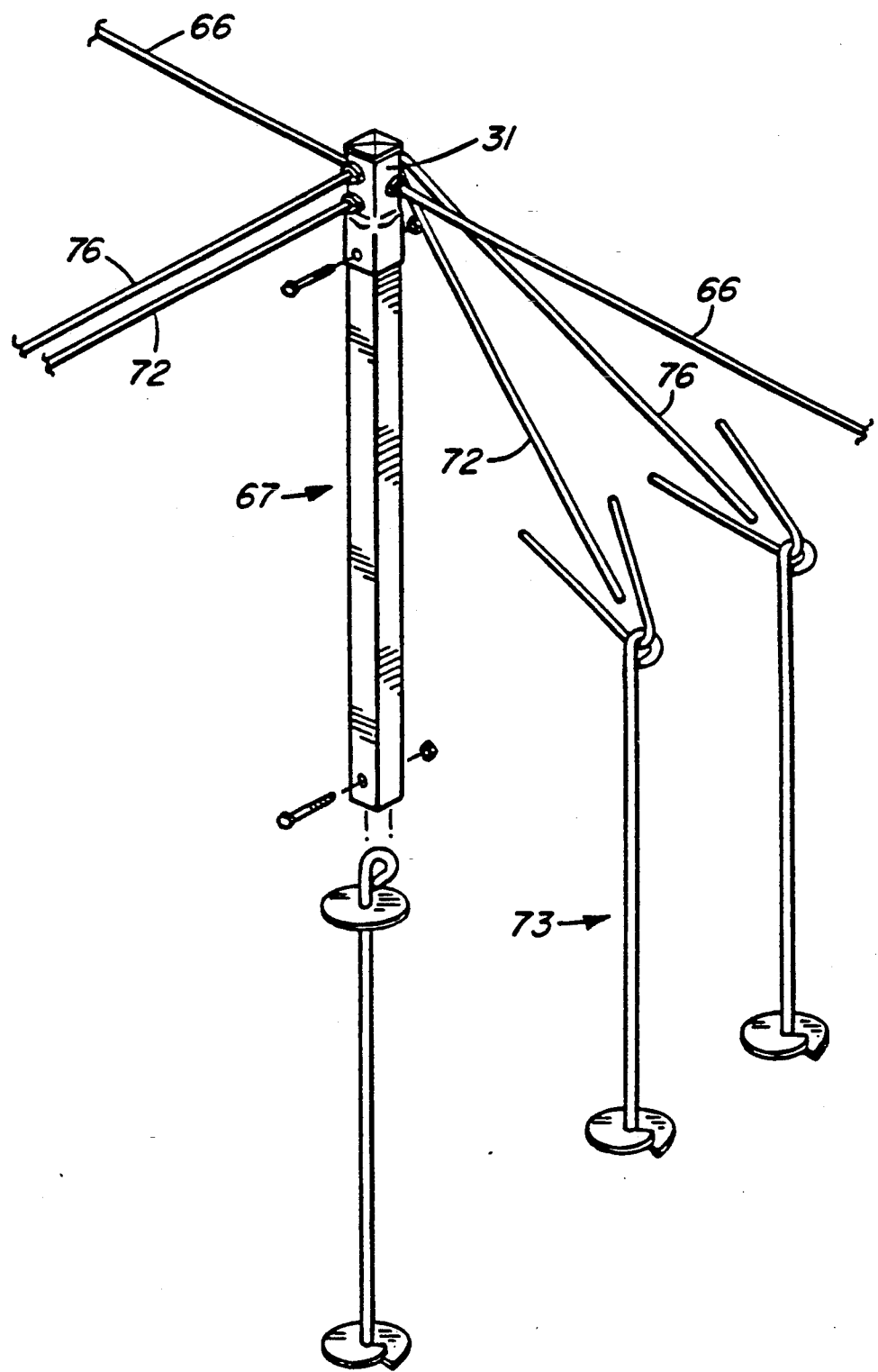
Figure 21:
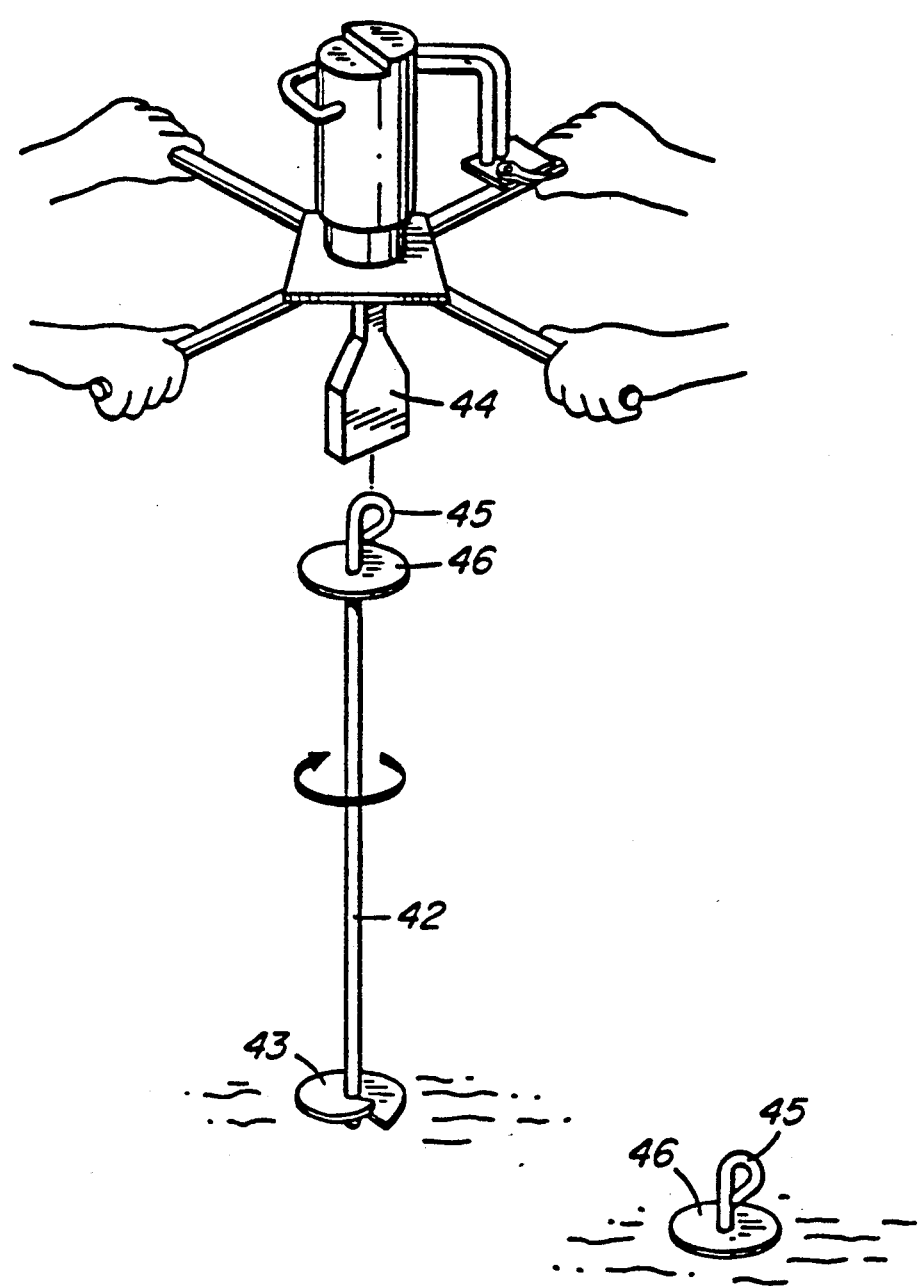
Figure 22:
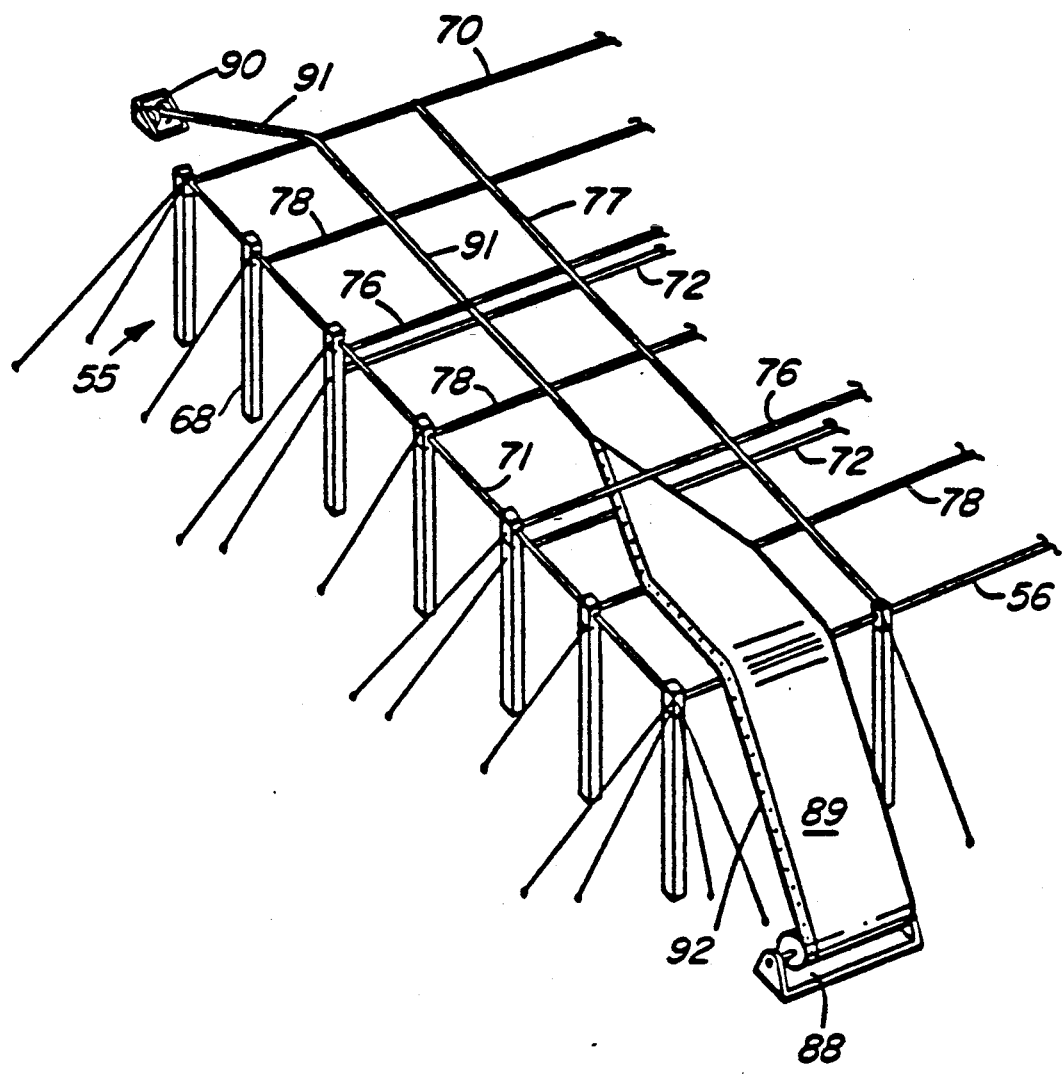
Figure 23:
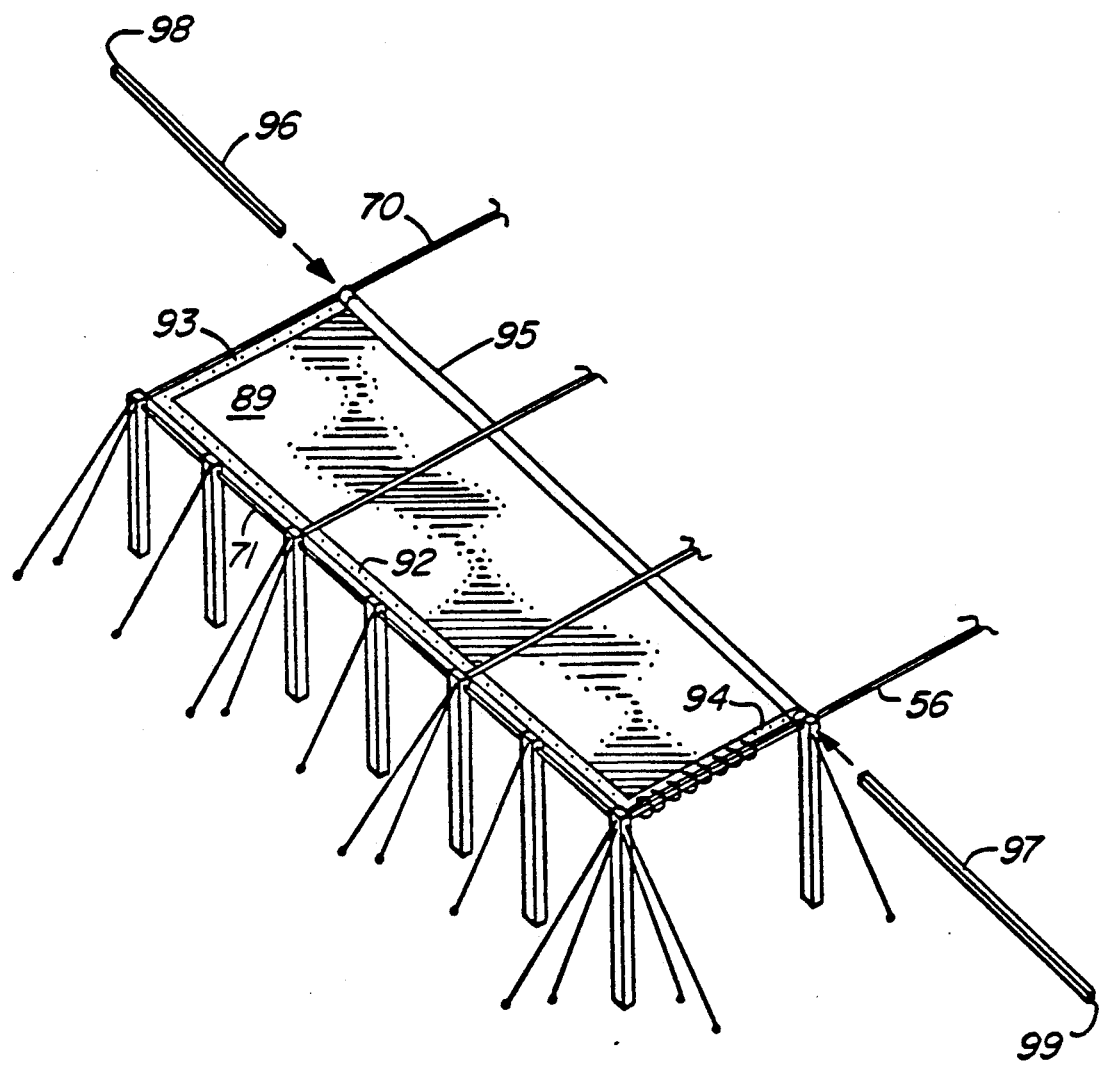
Figure 24:
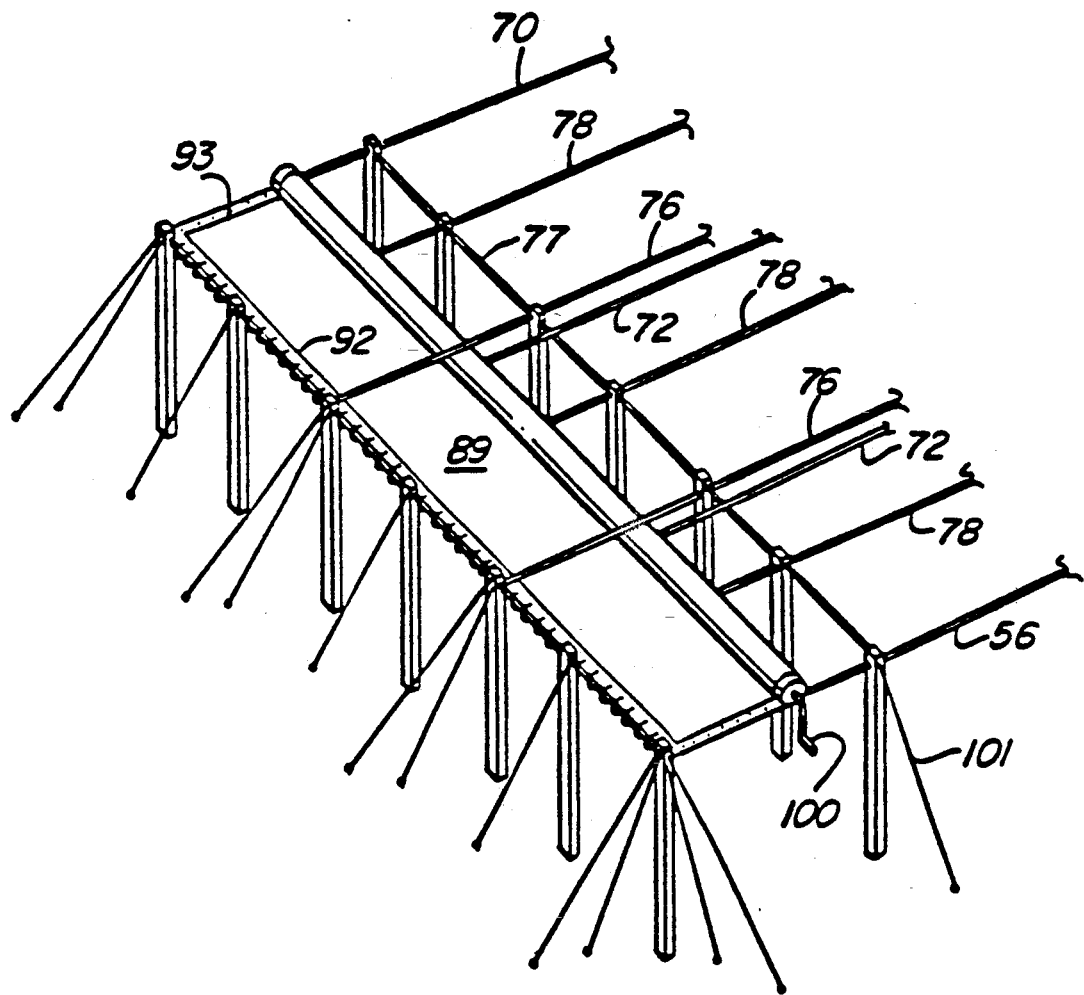

FIG. 20 an exploded view indicating the installation of a main pole;

FIG. 21 the installation of an earth anchor;

FIG. 22 the step of installing the roof sheet or fabric;

FIG. 23 the inserting of a roll-up core into a strip of a shading roof sheet; and FIG. 24 the rolling up of a strip of the shading sheet.

Referring briefly to FIGS. 13, 14 and 15, the poles of the shade house of the present invention consist of a tubular body 30 the top of which is provided with a pole top 31. The pole top 31 is a solid member complementary with the top end of the body 30. It has a pair of passages 32, 33, parallel with each other and disposed centrally of the pole. Another passage 34 is at right angles to the passages 32, 33. A plastic cap 35 encloses the pole top 31. The lower end of the pole top is adapted to receive the top end of the body 30. A passage 36 extends through the top 31 and the body 30 to provide for a fixed securement between the two by a bolt 37. The lower end of the body 30 is provided with a passage 38 receiving a bolt 39 provided with a complementary nut 40. The significance of a single bolt being used is in that in extreme conditions, for instance a heavy hail storm, when the shade is filled with a heavy layer of hail, the structure may collapse and the tubular members 30 remain secured to the respective earth anchors thus facilitating the re-erecting of the collapsed structure by merely providing for a supplemental anchoring of the cable system outside of the shade house, as will be described.

The body 30 is complementary with a pole anchor (FIG. 14) made of steel and including a stem 42 about 4 feet long. The lower end of the stem 42 is provided with a helical member 43 adapted to threadably engage the ground as the stem is rotated by a motor driven device diagrammatically shown in FIG. 21. The device shown includes a motor driven eyelet engaging sleeve 44 which can be inserted over the top eyelet 45 integral with the stem 42. A base plate 46 has a flat underside or ground engaging surface which is planar and radial relative to the axis of the stem 42. The eyelet 45 defines a passage 47 the spacing of which from the top of the base plate 46 is the same as that of the passage 38 from the lower end of the tubular body 30.

The cable anchor of the type shown in FIG. 15, similar to the pole anchor shown in FIG. 14. The cable anchor of FIG. 15 also has a stem 48 about four feet long, a ground penetrating helical member 49 and an eyelet 50 integral with the stem at the top end thereof. The eyelet receives a generally V-shaped so called "dead end grip" 51 which is adapted to become spliced over the end of a tensioned cable to firmly secure same to the eyelet 54 and thus anchor same to the ground as will be described.

The structure of the parts of the pole shown in FIG. 13 and the anchors of FIGS. 14 and 15 identical to those of the remaining poles and cables. Its parts are therefore shown with the same reference numbers regardless of the instant position of the particular member of the structure.

Turning now back to FIG. 1 (also referring to FIG. 18) the drawing shows diagrammatically a rectangular plan of a shade house, including four corners 52, 53, 54 and 55. A number of stakes, indicated by dots, designates the beforehand marking of the points where the anchors are to be driven into the ground, as will be described. In FIG. 1, the required number (five) of the pole tops 31 has been threaded on a peripheral cable 56 and two cable anchors 57, 58 (see also FIG. 18) driven in the ground together with pole anchors 59, 60 of two corner poles 61, 62.

In the stage of FIG. 1, the peripheral cable 56 is slack, is threaded through the respective cable passages 34 (FIG. 13) of the tops 31 of the two corner posts 61, 62, and is spliced (by the "dead end grip" 51-FIG. 15) to the anchored end of cable 56 to cable anchor 57, while there is a loose connection at cable anchor 58. In the next step, the cable 56 is tensioned, for instance by a tensioning device which will be described later with reference to FIG. 16.

With the cable 56 tensioned and the corner posts 61, 62 upright, as shown in FIG. 2, a cable clip 63 (FIG. 18) is placed over the cable 56 at the top member 31 of the corner post 61 and a similar clip is placed over the cable 56 at the opposing face of the top 31 of the other corner post 62, the second clip not being shown. A plurality of cable clips is used in similar fashion and shown in the drawings. The cable clip is a well known commercially available product: it is basically a U-shaped yoke which straddles the cable and is generally fixedly secured to it by a pressure plate slidable along the legs of the "U" shaped member and clamped against the cable by nuts threaded on the free ends of the legs. It provides a washer-like engagement surface for the top of the respective posts, holding the posts upright and preventing their tipping over towards each other.

Thus, the cable 56 includes a section extending between the poles and forming a part of what is generally referred to as "peripheral cable means", and, outside of the plan of the shade house, a downwardly and outwardly sloping anchoring section which is generally referred to as "anchor cable means". In other words, in the embodiment shown, the particular section of "peripheral cable means" and the "anchor cable means" is a single cable. A similar arrangement is utilized throughout most of other cable means as they will be described.

The next stage, shown in FIG. 2 is reached by securing the tubular pole members 30 of peripheral poles 64 (whose pole anchors may already have been driven into ground) to their respective top members 31 to provide an A-frame arrangement as shown in FIG. 2.

The following step is that of erecting the next corner post 65 and installing and tensioning a second peripheral cable 66 between the corner posts, the cable 66 being likewise provided with suitable number of top members 31 of a second group of peripheral posts and providing an A-frame arrangement in the same fashion as described in connection with FIG. 2. It is noteworthy that the peripheral poles of this second group include alternatingly so-called main poles 67 and so-called dummy poles 68. The difference between the two will be explained later.

The next step is that of erecting the fourth corner pole 69 and installing the next row of peripheral posts 65 on the third peripheral cable 70 parallel with and opposed to the cable 56. This results in the structural arrangement of FIG. 3.

The last, fourth peripheral cable 71 is installed between corner posts 69, 62, with main and dummy peripheral poles 67, 68 in the same pattern as between the corner posts 61, 65. This results in an arrangement shown in FIG. 4.

Before referring to FIGS. 5-10, attention is drawn to the fact that these figures are taken from the right of FIGS. 1-4.

Figures 5, 6:
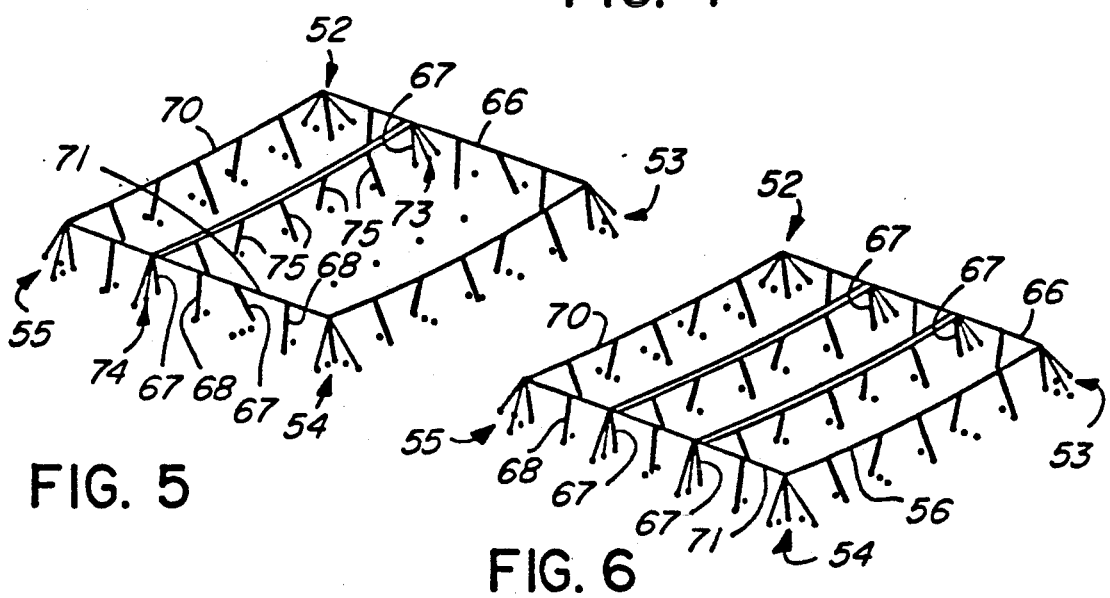
Figure 7:
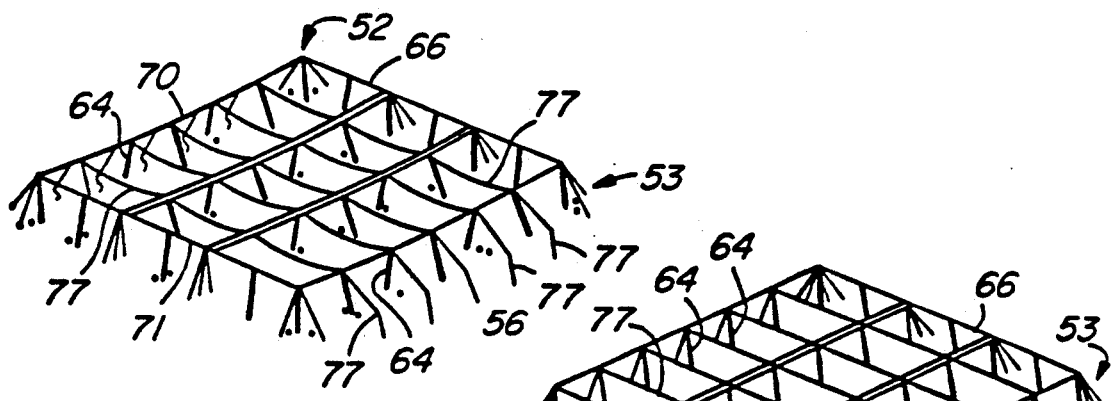

With the peripheral cable means 56, 65, 70, 71 now tensionally extending between top portions 31 of the adjacent corner poles 61-62, 61-65, 65-69 and 69-62, respectively, cables are installed between the first one of the opposed pairs of main poles. Reference may be had to FIGS. 5 and 20, of which FIG. 20 shows the main post 67 between the corners 52, 53 of FIG. 5 in greater detail.

There is an inside roof supporting cable 72 which is threaded through the passage 33 (cf. FIG. 13) of each of the opposed posts 67. It is provided with a required number of the top members 31 which are oriented in the same fashion as the member 31 in FIG. 20. With the opposed main posts 67 upright and anchored as described, the ends of the cable 72 are anchored at cable anchors 73, 74. A plurality of inside poles 75 is then produced by securing the respective tubular bodies 30 (FIG. 30) to the tops 31 threaded on the cable 72. A holding cable 76 has likewise been threaded through the upper passages 32 of the tops 31 of the inside poles 75 and anchored at the respective ends to respective cable anchors, outside of the associated main poles. The resulting structure is indicated in FIG. 5. The position of the cable clips is shown with reference numbers 76a and 77a.

In order to arrive at the next step, shown in FIG. 6, the steps described in the preceding paragraph are repeated at the second pair of opposed main poles 67, 67.

Figure 8:
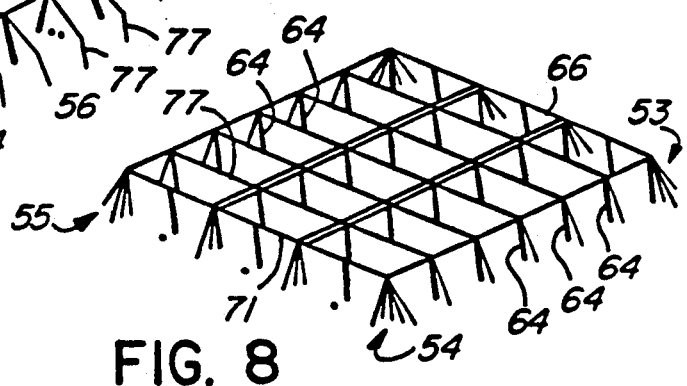
Figure 9:
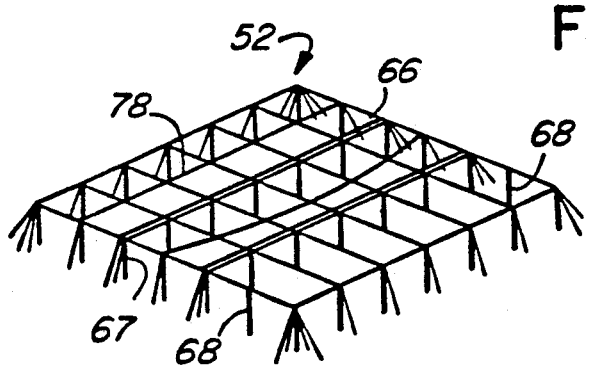

With the pair of supporting and holding cables 72, 76 in place, the next step taken is the installation of roof supporting cables 77, extending perpendicularly to the supporting cables 72, between the pairs of opposed peripheral posts 64. The cables 77 pass through the passages 34 (FIG. 13) of the inside poles 75. FIG. 8 shows the stage where all peripheral poles and inside poles have been brought in an upright position and the cables tightened and anchored to their respective cable anchors.

The last set of the roof supporting cables to be installed is that running between the opposed pairs of the dummy poles 68. As best seen from FIGS. 9 and 10, the roof supporting cables 78 are stretched between the opposed peripheral poles 68 but do not have any inside supporting poles. Instead, they run over the roof supporting cables 77 at right angles thereto, to provide additional support for the roof sheet which will be described later.

The preferred tensioning way of the cables 78 between the opposed dummy poles is shown in FIG. 16, with the tensioned state indicated in FIG. 17 which is shown in an exploded view but in which the cables 78, 66 are both shown under tension and with cable clips 78a, 66a, it being understood that another clip 66a is not visible and is thus only shown with a broken lead line. Those skilled in the art will appreciate that the same method may be applied for other cables and that other methods of stretching the cables may be employed. In FIG. 16, a splice 79 is applied to an intermediate part of the cable 78. A tensioning tool 80, known in the trade as a "come-along", is connected at its one end 81 to the splice 79 and at its other end 82 to the top 31 of the post 68 from which the cap 35 (FIG. 13) has been removed. Another "come-along" 83 is disposed between the top 31 and an earth anchor 84 and tensioned to firmly hold the post 68 upright when tension is developed at the cable 78 by the come-along 80. The slack end of the cable 78 is then hand tensioned and spliced to the anchor 85 by means of a dead end grip 86. With the free end of cable 78 secured to the grip 86, the two tensioning tools can be released and the splice 79 removed from the cable 78 so as not to obstruct the movement of the roof sheet.

Those skilled in the art will readily appreciate that the tensioning of the individual cables of the structure can be carried out in the same fashion or in a slightly different way with respect to any other cables or posts.

Figure 10:
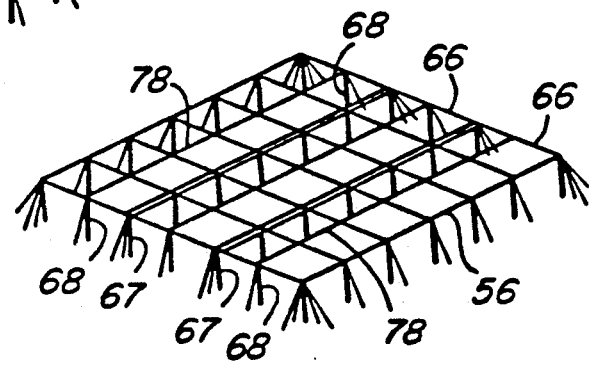

With all of the posts upright and the cables stretched, the structure of FIGS. 10 or 11 is obtained, the only difference between the two representations being that the view of FIG. 11 is again brought in line with the original representations of FIGS. 1, 2 3 and 4.

Before proceeding with the description, a brief review of FIG. 18 showing the corner post 61 is suggested. A corner post anchoring cable 87 is threaded in the lower passage 33. Both free ends of the cable 87 are anchored to additional corner earth anchors 102 and 103 utilizing the same "dead-end" grip 51 described above.

With the structure of the frame now erected and tensioned as shown in FIG. 10, the next item is the provision of a fabric roll 88 (FIG. 22) which holds a folded roofing fabric strip 89. A winch 90 is placed at the opposed end of the structure. It is provided with a pull cable 91 which extends over the peripheral cable 70, roof supporting cable 78, between the roof supporting cable 72 and the holding cable 76, then over another roof supporting cable 78, between another pair of roof supporting and holding cables 72, 76, over a still further roof supporting cable 78 to the peripheral cable 56 and down to the roll 88, to pull the strip 89. The strip 89 is intended to cover the bay between peripheral cable 71 and the roof supporting cable 77. The width of the folded fabric strip 89 is approximately one-third of the overall width between cables 71 and 77. The width between cable 71 and 77 is typically about 12 feet. The fabric strip 89 has a side edge 92 and a first and second end edges 93, 94, respectively, visible only in FIG. 23 and FIG. 24. The edges 92, 93 and 94 are provided with grommets receiving S-shaped hooks for securing the edges of the fabric 89 to the respective cables 71, 70, and 56 as diagrammatically indicated in FIGS. 23 and 24.

The longitudinal edge of the fabric 89 opposite to the edge 92 is provided with a core receiving sleeve 95 adapted to receive a winding core, in the embodiment shown, a two piece winding core 96, 97 the outer free ends 98, 99 of which are eventually provided with cranks such as a crank 100 shown in FIG. 24. The cranks are adapted to become secured to one of the cables, for instance to the anchoring cable 101 shown in FIG. 24 and being an extension of cable 77 as shown to retain the crank in a desired location along the cables 56 or 70. With the fabric 89 pulled by the winch 91 in place, the fabric is unfolded and the side edge 92 secured to the cable 71 as shown in FIG. 24. Eventually, the first and second end edges 94 and 93 are also secured to cables 56, 70 and the sleeve 95 is likewise suitably secured to the cable 77. If necessary, a "come-along" stretching device can be used to secure the roof fabric. The crank 100 is suitably secured to the structure, for instance to the cable 101. If it is desired to fold the roof structure in the winter time, the securement of the first and second end edges 93 and 94 together with that of the sleeve 95 to cable 77 and of the cranks 100 is released and the crank cores 96, 97 are then free to roll up the strip 89 in a fashion diagrammatically shown in FIG. 24. The remaining sections of the entire roof are covered by similar strips 89 in the fashion described.

Figures 11, 12:
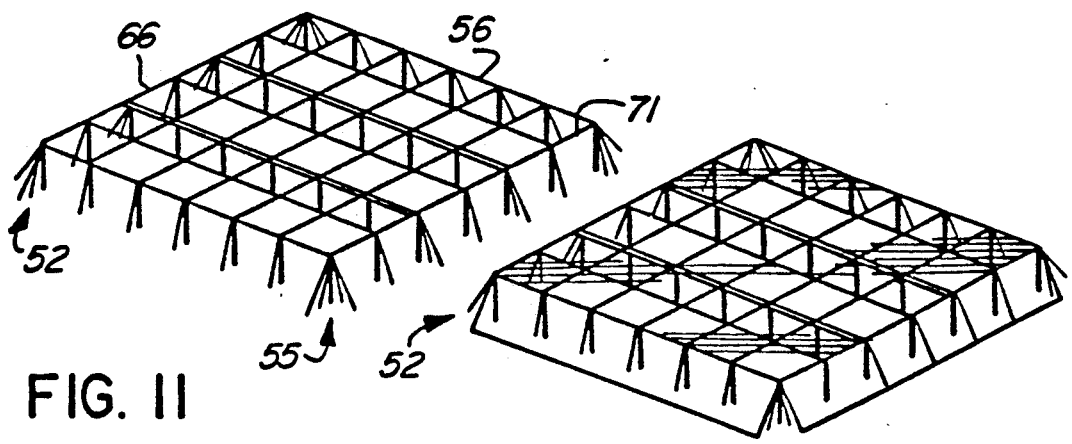

The downwardly and outwardly sloping side walls shown in FIG. 12 can be added manually if required, over the anchoring cables and likewise secured to the cables in generally the same way as described in connection with the roof. They are preferably separate from the roof forming fabric 89.

Those skilled in the art will readily appreciate that many modifications are available of the system described which would not depart from the scope of the present invention. Accordingly, I wish to protect by Letters Patent which I issue on the present application all such embodiments as properly fall within the scope of my contribution to the art.

I claim:

1. A shade house having a multilateral plan with a contour with a plurality of corners and including a flat roof formed by a flexible sheet material supported by a cable network, said shade house comprising;
    (a) a plurality of corner poles disposed one at each corner of said plan, each said corner pole being anchored to the ground by an auger-type earth anchor;
    (b) a plurality of peripheral poles disposed at a generally equidistant spacing on lines defining the contour of said plan, each said peripheral pole being anchored to the ground by an auger-type earth anchor;
    (c) a plurality of inside poles spaced from each other and defining a pattern of cable support points located on longitudinal and transverse rows within said plan, each said inside pole being anchored to the ground by an auger-type earth anchor;
    (d) a peripheral cable system forming a part of said cable network and including a plurality of peripheral cables, each peripheral cable extending, in a tensioned state, between top portions of a pair of adjacent ones of said corner poles and passing through top portions of the peripheral poles disposed between the respective pair of adjacent ones of said corner poles, whereby the peripheral cable system coincides with said contour;

(e) an anchor cable arrangement located exteriorly of the shade house and including a plurality of anchor cable means, each anchor cable means being secured, at a first end thereof, to one of said corner poles or to one of said peripheral poles, and, at a second end thereof, to an earth anchor means, whereby each of said corner poles and said peripheral poles is provided with anchor cable means, the anchor cable means being tensioned thus holding said corner poles and said peripheral poles in a generally upright position and maintaining said cable network in a tensioned state;

(f) a plurality of inside cable means forming a part of said cable network, each inside cable means extending, in a tensioned state, across the plan of the house, from one of said peripheral poles to an opposed one of said peripheral poles, each inside cable means being supported by a number of said inside poles;

(g) said flexible sheet material having peripheral edge portions secured to said network; and (h) a plurality of holding cable systems parallel with and generally equidistantly spaced from each other and disposed parallel with and closely vertically above at least some of the inside cables, with said flexible sheet material disposed on top of the supporting cables but below the holding cable systems.

2. A shade house as claimed in claim 1, wherein each said pole includes a hollow tubular body including an upper end portion and a bottom end portion, an anchor securement device for securing said bottom end portion to the respective anchor; and a pole top member secured to said upper end portion, said pole top member being provided with two straight passages disposed generally at right angles to and slightly above each other and complementary with the respective cable means.

3. A shade house as claimed in claim 2, wherein each said earth anchor includes an elongated stem having an upper end and a lower end, an eye disposed near and integrally connected to said upper end of the stem, and a base plate fixedly secured to the stem near said upper end thereof and providing a generally planar, ground engaging surface disposed radially around the stem; and a helical member disposed at and generally integrally connected to the stem at said lower end thereof.

4. A shade house as claimed in claim 3, wherein said eyelet is an integral part of said stem; said tubular body further including a transverse passage near said bottom end portion thereof; the distance between the passage from the bottom end portion of the body being generally the same as that between said eye and said base plate, and a single bolt passing through the eye and said passage to secure the tubular body to the anchor and to allow collapse of the tubular body while it remains secured to the respective earth anchor.

5. A shade house having a generally rectangular plan with a contour with a plurality of corners and including a flat roof formed by a flexible sheet material supported by a cable network, said shade house comprising;

(a) a plurality of corner poles disposed one at each corner of said plan, each said corner pole being anchored to the ground by an auger-type earth anchor;

(b) a plurality of peripheral poles disposed at a generally equidistant spacing on lines defining the contour of said plan, each said peripheral pole being anchored to the ground by an auger-type earth anchor;

(c) a plurality of inside poles spaced from each other and defining a pattern of cable support points located on longitudinal and transverse rows within said plan, said rows being generally perpendicular to each other, each said inside pole being anchored to the ground by an auger-type earth anchor;

(d) the spacing between the inside poles in one of said longitudinal and transverse rows being about twice that in the other one of the longitudinal and transverse rows;

(e) a peripheral cable system forming a part of said cable network and including a plurality of peripheral cables, each peripheral cable extending, in a tensioned state, between top portions of a pair of adjacent ones of said corner poles and passing through top portions of the peripheral poles disposed between the respective pair of adjacent ones of said corner poles, whereby the peripheral cable system coincides with said contour; (f) an anchor cable arrangement located exteriorly of the shade house and including a plurality of anchor cable means, each anchor cable means being secured, at a first end thereof, to one of said corner poles or to one of said peripheral poles, and, at a second end thereof, to an earth anchor means, whereby each of said corner poles and said peripheral poles is provided with anchor cable means, the anchor cable means being tensioned thus holding said corner poles and said peripheral poles in a generally upright position and maintaining said cable network in a tensioned state;

(g) a plurality of inside cable means forming a part of said network, each inside cable means extending, in a tensioned state, across the plan of the house, from one of said peripheral poles to an opposed one of said peripheral poles, each inside cable means being supported by a number of said inside poles;

(h) said flexible sheet material having peripheral edge portions secured to said network;

(i) a plurality of holding cable systems parallel with and generally equidistantly spaced from each other and disposed parallel with and closely vertically above at least some of the inside cables, with said flexible sheet material disposed on top of the supporting cables but below the holding cable systems; and (j) said flexible sheet material is comprised of a plurality of strips of sheet material, the width of each strip being selected to correspond to the distance between two adjacent peripheral poles disposed along said other two opposed parallel sides; whereby, in a fully extended state, each strip covers the area between two adjacent roof supporting cables secured to said adjacent peripheral poles.

6. A shade house as claimed in claim 5, wherein one longitudinal edge of each strip is secured to one of said adjacent roof supporting cables, while the opposed longitudinal edge is secured to a roll-up core device parallel with the other one of said adjacent roof supporting cables and generally coincident with the latter when the respective strip is in a fully extended position.

7. A shade house as claimed in claim 6, wherein said roll-up core device includes a hand crank means at each end of the strip, and a securing device adapted to fixedly secure the roll-up core selectively in a fully extended position of the respective strip, and in a fully rolled-up position thereof.

8. A shade house as claimed in claim 5, wherein each said pole includes a hollow tubular body including an upper end portion and a bottom end portion, an anchor securement device for securing said bottom end portion to the respective anchor; and a pole top member secured to said upper end portion, said pole top member being provided with two straight passages disposed generally at right angles to and slightly above each other and complementary with the respective cable means.

9. A shade house as claimed in claim 8, wherein each said earth anchor includes an elongated stem having an upper end and a lower end, an eye disposed near and integrally connected to said upper end of the stem, and a base plate fixedly secured to the stem near said upper end thereof and providing a generally planar, ground engaging surface disposed radially around the stem; and a helical member disposed at and generally integrally connected to the stem at said lower end thereof.

10. A shade house as claimed in claim 9, wherein said eyelet is an integral part of said stem; said tubular body further including a transverse passage near said bottom end portion thereof; the distance between the passage from the bottom end portion of the body being generally the same as that between said eye and said base plate, and a single bolt passing through the eye and said passage to secure the tubular body to the anchor and to allow collapse of the tubular body while it remains secured to the respective earth anchor.

* * * * *